US007614417B2

(12) United States Patent
Simon et al.

(10) Patent No.: US 7,614,417 B2
(45) Date of Patent: Nov. 10, 2009

(54) AIR RELEASE VALVE FOR FUEL TANK OF A MOTOR VEHICLE

(75) Inventors: Dieter Simon, Treuchtlingen (DE); Dirk Batrz, Köln (DE); Josip Martiš, Rot am See (DE)

(73) Assignee: Alfmeier Prazision AG Baugruppen und Systemlosungen, Treuchtlingen (DE)

( * ) Notice: Subject to any disclaimer, the term of this patent is extended or adjusted under 35 U.S.C. 154(b) by 284 days.

(21) Appl. No.: 11/496,012

(22) Filed: Jul. 28, 2006

(65) Prior Publication Data

US 2007/0039648 A1 Feb. 22, 2007

(30) Foreign Application Priority Data

Aug. 5, 2005 (DE) .................. 10 2005 036 932

(51) Int. Cl.
*F16K 24/04* (2006.01)
(52) U.S. Cl. ......................... 137/202; 137/43
(58) Field of Classification Search ................... 137/39, 137/43, 202, 587
See application file for complete search history.

(56) References Cited

U.S. PATENT DOCUMENTS

| | | | |
|---|---|---|---|
| 4,351,350 A | 9/1982 | Crute | |
| 4,392,507 A | 7/1983 | Harris | |
| 4,646,772 A | 3/1987 | Bergsma | |
| 4,655,238 A | 4/1987 | Szlaga | |
| 4,694,847 A | 9/1987 | Szlaga | |
| 4,699,638 A | 10/1987 | Harris | |
| 4,715,403 A | 12/1987 | Szlaga | |
| 4,735,226 A | 4/1988 | Szlaga | |
| 4,742,844 A | 5/1988 | Szlaga | |
| 4,753,262 A | 6/1988 | Bergsma | |
| 4,760,858 A | 8/1988 | Szlaga | |
| 4,790,349 A | 12/1988 | Harris | |
| 4,805,663 A | 2/1989 | Szlaga | |
| 4,815,705 A | 3/1989 | Kasugai et al. | |
| 4,886,089 A | 12/1989 | Gabrlik et al. | |
| 4,905,726 A | 3/1990 | Kasugai et al. | |
| 4,953,583 A | 9/1990 | Szlaga | |

(Continued)

FOREIGN PATENT DOCUMENTS

DE 10017323 10/2001

(Continued)

OTHER PUBLICATIONS

English language Abstract of DE 10017323; esp@cenet.com.

(Continued)

*Primary Examiner*—Stephen Hepperle
*Assistant Examiner*—Craig Price
(74) *Attorney, Agent, or Firm*—Dority & Manning, P.A.

(57) ABSTRACT

The device includes an air release valve for a fuel tank of a motor vehicle, the air release valve comprising a housing defining at least one inlet opening therein, a central axis and a wall disposed proximate the inlet opening, the wall defining at least two outlet openings therein, the two outlet openings being sized differently; a sealing seat disposed about the two outlet openings; a float disposed in the housing moveable along the central axis, the float defining a center aligned with the central axis; and a flexible membrane attached proximate the center and extending freely therefrom to seal the two outlet openings.

13 Claims, 10 Drawing Sheets

U.S. PATENT DOCUMENTS

| | | | | |
|---|---|---|---|---|
| 4,982,757 | A | 1/1991 | Ohasi et al. | |
| 4,991,615 | A | 2/1991 | Szlaga et al. | |
| 5,027,844 | A | 7/1991 | Forsythe | |
| 5,028,244 | A | 7/1991 | Szlaga | |
| 5,044,389 | A | 9/1991 | Gimby | |
| 5,044,397 | A | 9/1991 | Szlaga et al. | |
| 5,062,444 | A | 11/1991 | Bergsma | |
| 5,065,782 | A | 11/1991 | Szlaga | |
| 5,111,837 | A | 5/1992 | Morris et al. | |
| 5,116,257 | A | 5/1992 | Szlaga | |
| 5,183,087 | A | 2/1993 | Aubel et al. | |
| 5,234,013 | A | 8/1993 | Roetker | |
| 5,234,022 | A | 8/1993 | Harris | |
| 5,261,439 | A | 11/1993 | Harris | |
| 5,402,818 | A | 4/1995 | Kasugai et al. | |
| 5,404,907 | A | 4/1995 | Benjey et al. | |
| 5,439,023 | A | 8/1995 | Horikawa | |
| 5,443,561 | A * | 8/1995 | Sakata et al. | 137/202 |
| 5,449,018 | A | 9/1995 | Harris | |
| 5,449,029 | A | 9/1995 | Harris | |
| 5,497,800 | A | 3/1996 | Ohashi et al. | |
| 5,518,018 | A | 5/1996 | Roetker | |
| 5,524,662 | A | 6/1996 | Benjey et al. | |
| 5,529,086 | A | 6/1996 | Kasugai et al. | |
| 5,535,772 | A | 7/1996 | Roetker et al. | |
| 5,566,705 | A | 10/1996 | Harris | |
| 5,582,198 | A | 12/1996 | Nagino et al. | |
| 5,603,349 | A * | 2/1997 | Harris | 137/588 |
| 5,638,856 | A | 6/1997 | Ohsaki | |
| 5,640,993 | A | 6/1997 | Kasugai et al. | |
| 5,666,989 | A | 9/1997 | Roetker | |
| 5,678,590 | A | 10/1997 | Kasugai et al. | |
| 5,687,756 | A * | 11/1997 | VanNatta et al. | 137/202 |
| 5,687,778 | A | 11/1997 | Harris | |
| 5,694,968 | A | 12/1997 | Devall et al. | |
| 5,711,339 | A * | 1/1998 | Kurihara | 137/43 |
| 5,738,132 | A | 4/1998 | Zakai et al. | |
| 5,755,248 | A | 5/1998 | Szlaga et al. | |
| 5,755,252 | A | 5/1998 | Bergsma et al. | |
| 5,762,090 | A | 6/1998 | Halamish et al. | |
| 5,832,950 | A | 11/1998 | Shimada et al. | |
| 5,960,816 | A | 10/1999 | Mills et al. | |
| 5,975,116 | A | 11/1999 | Rosas et al. | |
| 5,983,958 | A | 11/1999 | Bergsma et al. | |
| 5,996,607 | A | 12/1999 | Bergsma et al. | |
| 6,003,499 | A | 12/1999 | Devall et al. | |
| 6,026,848 | A | 2/2000 | Huynh | |
| 6,035,884 | A | 3/2000 | King et al. | |
| 6,058,963 | A | 5/2000 | Enge et al. | |
| 6,062,276 | A | 5/2000 | Benjey et al. | |
| 6,085,771 | A | 7/2000 | Benjey et al. | |
| 6,167,920 | B1 | 1/2001 | Enge | |
| 6,170,510 | B1 | 1/2001 | King et al. | |
| 6,189,567 | B1 | 2/2001 | Foltz | |
| 6,199,574 | B1 | 3/2001 | Harris | |
| 6,206,057 | B1 | 3/2001 | Benjey et al. | |
| 6,240,950 | B1 | 6/2001 | Harris | |
| 6,508,263 | B1 | 1/2003 | Jahnke et al. | |
| 6,516,835 | B2 | 2/2003 | Enge | |
| 6,546,954 | B2 | 4/2003 | Sato et al. | |
| 6,557,578 | B2 | 5/2003 | Shimamura et al. | |
| 6,561,211 | B2 | 5/2003 | Devall | |
| 6,564,822 | B2 | 5/2003 | Muto et al. | |
| 6,578,597 | B2 | 6/2003 | Groom et al. | |
| 6,591,855 | B2 | 7/2003 | Nishi et al. | |
| 6,601,617 | B2 | 8/2003 | Enge | |
| 6,612,324 | B2 | 9/2003 | Szlaga | |
| 6,634,341 | B2 | 10/2003 | Cary et al. | |
| 6,691,725 | B2 | 2/2004 | Zorine | |
| 6,758,235 | B2 | 7/2004 | Frohwein et al. | |
| 6,929,025 | B2 | 8/2005 | Sato | |
| 6,959,720 | B2 | 11/2005 | Kurihara et al. | |
| 7,114,513 | B2 * | 10/2006 | Kurihara et al. | 137/202 |
| 7,243,639 | B2 * | 7/2007 | Ueki | 123/516 |
| 2001/0025652 | A1 * | 10/2001 | Sugizaki et al. | 137/202 |
| 2002/0040730 | A1 * | 4/2002 | Muto et al. | 137/202 |
| 2002/0157706 | A1 * | 10/2002 | Bergsma | 137/202 |
| 2003/0066558 | A1 | 4/2003 | Muto et al. | |
| 2005/0229967 | A1 * | 10/2005 | Ueki | 137/2 |

FOREIGN PATENT DOCUMENTS

| | | |
|---|---|---|
| DE | 10257223 A1 | 6/2004 |
| EP | 0724098 | 7/1996 |
| EP | 0941884 B1 | 2/2003 |
| EP | 1325829 A2 | 7/2003 |
| EP | 1332906 A1 | 8/2003 |
| EP | 1007872 B1 | 9/2003 |
| EP | 1200760 B1 | 9/2003 |
| EP | 0823577 B1 | 10/2003 |

OTHER PUBLICATIONS

French Search Report (with Translation) dated Jun. 14, 2007—10 pages.

English Abstract of DE 10257223 published Jun. 24, 2004.

* cited by examiner

AIR RELEASE VALVE FOR FUEL TANK OF A MOTOR VEHICLE

FIELD OF THE INVENTION

The disclosure concerns an air release valve for the fuel tank of a motor vehicle.

BACKGROUND OF THE INVENTION

Known valves of DE 100 17 323 A1 and US 2002/0040730 A1 serve for the air release from tanks during the filling operation and/or for the release of air from the tanks during driving of the vehicle. These known valves are normally set into an opening in the upper tank wall and possess at least one opening, by means of which a fuel-vapor/air mixture (in the following referred to as "gas") is conducted into the valve and subsequently released to the atmosphere through an outlet opening, this operation being carried out, as a rule, with interposed equipment allowing scrubbing of the gas through at least one activated carbon filter. In order to prevent, that during the driving, splashing fuel does not enter into the activated carbon filter, in the housing of the air release valve is to be found an axially movable float, which, on its top side, carries a sealing element which coacts with the outlet opening. As the tank approaches being filled, the float rises simultaneously with the rising level of the fuel, with the result that it closes the outlet opening. Such a closure is brought into effect also in a case of turbulently splashing fuel during road operation. This arrangement increases inside gas pressure, with the result that reopening an outlet opening, necessarily requires considerable force. In order to compensate for this situation, floats of considerable weight have been necessary. So that such a weighty float could maintain sufficient buoyancy, a corresponding displacement means proved necessary. Air release valves with such floats, on this account, became very voluminous and called for considerable material in their manufacture. U.S. Pat. No. 5,439,023 teaches of a two stage air release valve having a sealing element. Laterally, on one side of this sealing element rests a molded on, top located hook of the float structure. Because the hook initiates one way flow, the proposal of U.S. Pat. No. 5,439,023 is, that a thereby created lever operation increases the force exercised by the float upon the sealing element. Additionally, the sealing element is penetrated by a boring of small diameter, which in turn is closed by a second sealing element. Also this arrangement, upon the opening procedure, is subjected to force loading from lever action, whereby the boring of the first named sealing element is opened. DE 102 57 223 A1 also discloses a two stage air release valve. In this valve, the float possesses on one side of its top a linked lever arm, the middle section of which arm forms a sealing element, which coacts with an outlet opening. This element is likewise penetrated by a boring of small diameter which cooperates with a top-sided projection installed on the float as a sealing element. U.S. Pat. No. 5,738,132 discloses a single stage air release valve, wherein a slot-shaped, outlet opening runs at an angle to the central axis of the valve and has a flexible strip of membrane serving as a coacting sealing elements. One end of the membrane strip is affixed to the float. Consequently, the membrane is withdrawn from the outlet opening in successive fashion during the opening operations. That is to say, in particular, withdrawn from the surrounding seat of the sealing means.

BRIEF SUMMARY OF THE DISCLOSURE

The disclosure is directed to an alternatively structured air release, fuel tank valve, wherein the reopening of the valve in a case of an excess degree of inner content of the tank is assured by a simple design, which is economical in construction.

More particularly, an air release valve in accordance with the disclosure includes two outlet openings integral with one valve seat, which are of different sizes, and one flexible membrane serves as a sealing element. Further, this said membrane coacts as a common sealing element with the two outlet openings and is bound with the top side of the float at a point of affixment which is radially outside of an outlet opening. By means of an advantageous arrangement of the two outlet openings, in reference to the point of affixment and in a manner which simplifies mounting, material is saved and reliability is improved. Further, that area of the membrane which coacts with the smaller outlet opening, because of the now small application of force necessary, is repetitively primarily withdrawn from its sealing seat. When this so operates, then gas can escape to the outside and the internal valve pressure declines to such an extent that, in a short time, the weight of the float is sufficient to allow withdrawal of the membrane also from the larger outlet opening. This arrangement reduces the size of floats and allows relatively smaller valve housings, thus resulting in reduced installation space. The construction and the installation of the invented valve calls for a minimum amount of material. This is an improvement over the cost of complex and disturbance-prone designs.

Advantageously, the alignment of valve components depends on a corresponding alignment element centrally located with respect to the float. For example, any tendency for tilting or tipping of the float within the housing, in which it is guided, is diminished. To achieve this alignment of components, it is advantageous, if the outlet openings, in relation to this alignment element, lie radially close thereto. In this way, during an opening operation, the openings become proximal to the central axis of the float, and the surface of the sealing element, which requires a removal force, can be withdrawn from its seat. With this arrangement, any tilting force exercised on the float is correspondingly reduced, because of the small separating distance to the centerline axis.

Where an alignment element is concerned, which extends itself upward, beyond that side of the seal which is proximal to the outlet opening, provision is made in one approved embodiment that a housing wall which contains the outlet openings is shaped into a dome which extends itself axially away from and overtops the alignment element. That is, it is above the free end of the alignment element, which is centrally located. If the air release valve is closed, this dome encloses within it that sealing surface which it circumferentially encompasses including that part of the alignment element which penetrates the seal. Advantageously, the dome is placed on a top wall area which has extended itself between the outlet openings and on this account encompasses the free end of an alignment element which is placed centrally on the float. A sealing element, that is to say, a membrane, is advantageously fastened on the upper side of the float with the aid of an integral, molded on, alignment pin, i.e., the element, the free end of which penetrates a boring in the membrane and is undercut to accommodate the membrane. This arrangement assures a very simple alignment of the sealing element. The alignment pin must principally be passed through the boring with minimum clearance.

In another advantageous embodiment according to the disclosure, the axial overall dimension of the dome can be limited, in that the outlet openings of the membrane meet a tee, drawn from the wall material (hereinafter, a "necking structure") which, in a flow-guiding manner, extends itself thereunder. The free end-face of the necking structure forms, in this arrangement, the seat of the seal, which contacts the seal element. In order to assure, during a period when air release valve is closed, that the sealing zone of the sealing element, which acts on the outlet opening, lies tightly against the existing sealing seat, a raised platform of minimum area protrudes from the top side of the float and its exposed surface runs parallel to the plane common to the contact zone of the seated seal. This assures that the air release valve is securely closed when necessary, so that neither gas nor liquid fuel can migrate to the outside. The platform is advantageously created by at least one projection extending itself from the upper side of the float, and contacts only a portion of the surface of the sealing area. By means of this measure, prevention is assured, that the membrane can firmly stand in suction caused contact with the supporting structure, whereby unwanted withdrawal from the seat of sealing of an outlet opening during the opening procedure is prevented.

BRIEF DESCRIPTION OF THE DRAWINGS

The invention, in the following, will be more closely explained with the aid of reference to the attached drawings. There is shown in.

DETAILED DESCRIPTION OF THE DRAWINGS

Figure 1:
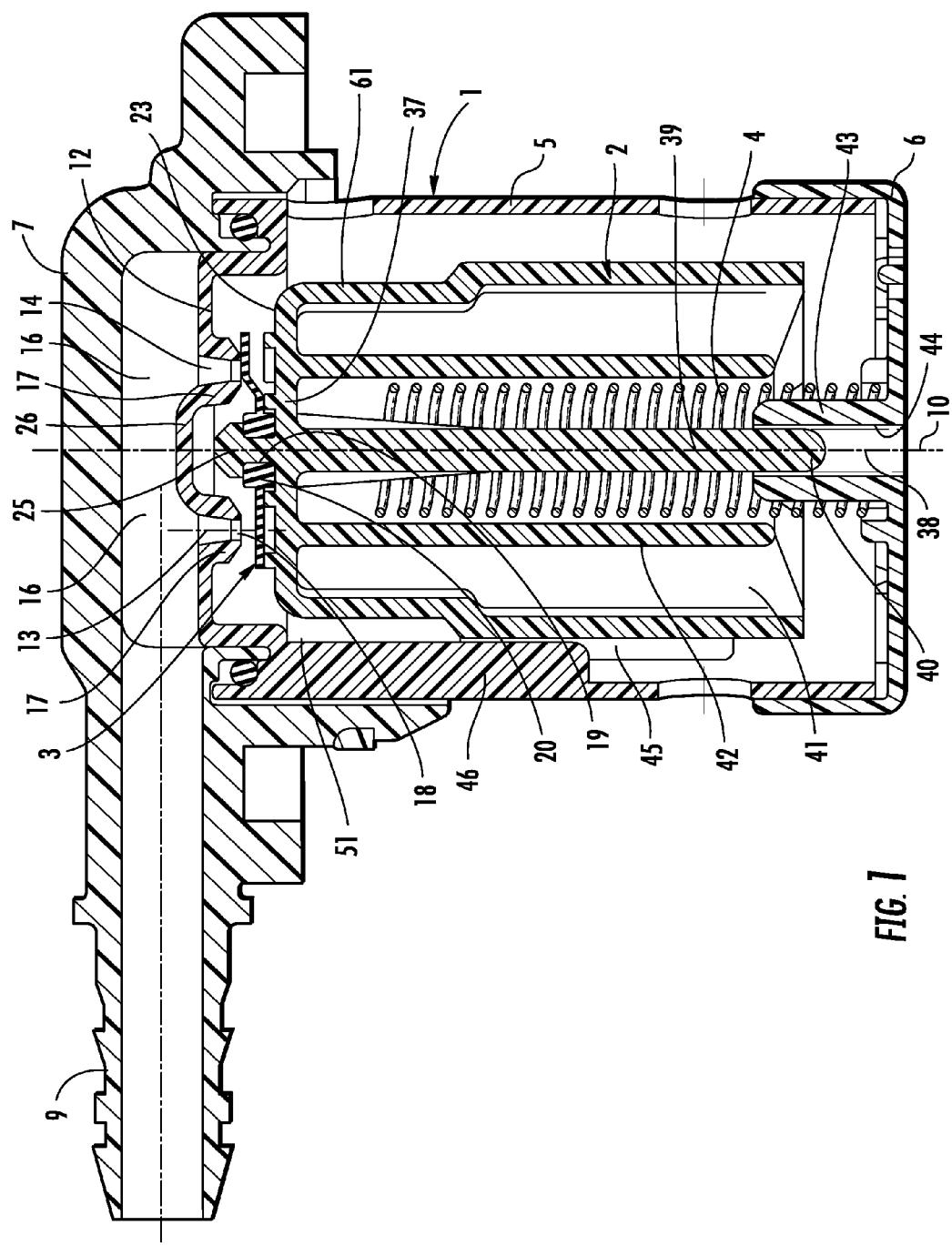
FIG. 1 an air release valve in a profile presentation.
Figure 2:
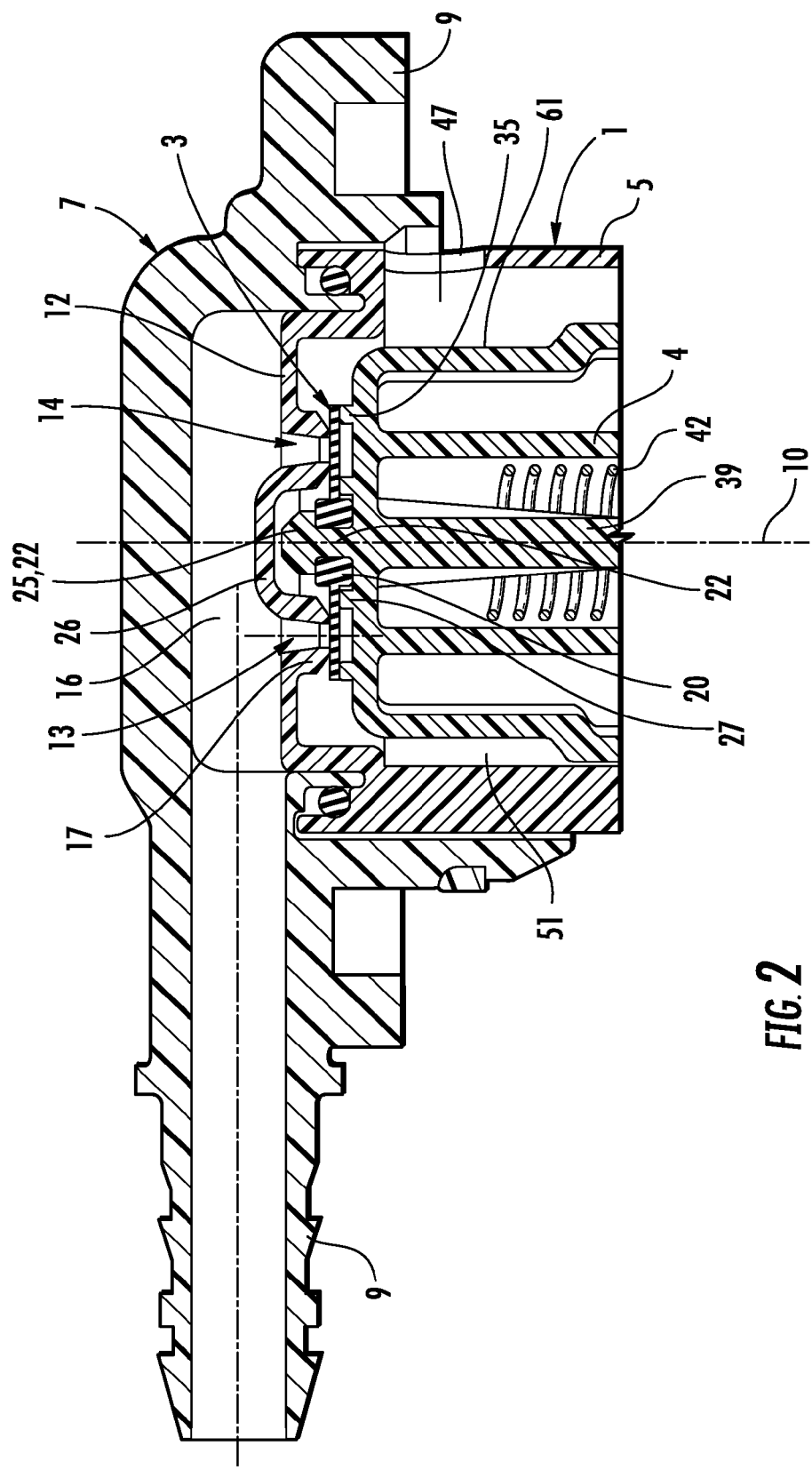
FIG. 2 an enlarged section of FIG. 1, wherein the valve is shown in its closed position, FIG. 3 a section corresponding to FIG. 2, which shows the air release valve in an intermediate position, FIG. 4 a profile view corresponding to FIG. 1, indicating the valve in its open position, FIG. 5 a cross-section along line V-V in FIG. 4, FIG. 6 a cross-section along line VI-VI in FIG. 4, FIG. 7 a cross-section along the line VII-VII in FIG. 4, FIG. 8 an alternatively designed air release valve in its open position, shown in a longitudinal profile, FIG. 9 a longitudinal section through the air release valve 8 along the lone IX-IX in FIG. 11, FIG. 10 a cross-section along the line X-X in FIG. 8, FIG. 11 a cross-section along the line XI-XI of FIG. 8 and FIG. 12 a cross-section along the line XII-XII in FIG. 8

Detailed reference will now be made to the drawings in which examples embodying the present invention are shown. The detailed description uses numerical and letter designations to refer to features in the drawings. Like or similar designations in the drawings and description have been used to refer to like or similar parts of the invention.

The drawings and detailed description provide a full and detailed written description provide a full and detailed written description of the invention and of the manner and process of making and use it, so as to enable one skilled in the pertinent art to make and use it, as well as the best mode of carrying out the invention. However, the examples set forth in the drawings and detailed description are provided by way of exploration only, and are not meant as limitations of the disclosure. The present disclosure thus includes any modifications and variations of the following examples as come within the scope of the appended claims and their equivalents.

The air release valve shown in FIG. 1 generally includes a housing 1, an axial, movable float 2 therein with directional guides, a sealing element 3 affixed on the top side of the float 2 and a helical spring 4, which loads the float toward a closing direction. The housing 1 has a shell part 5, a closed bottom 6 under the shell part 5, and uppermost on the shell part 5, a flange part 7. The flange part 7 serves to exactly position a flange 8 to the upper wall of a fuel tank (not shown). This flange 8 is integral with a flow connection fitting 9.

Figure 6:
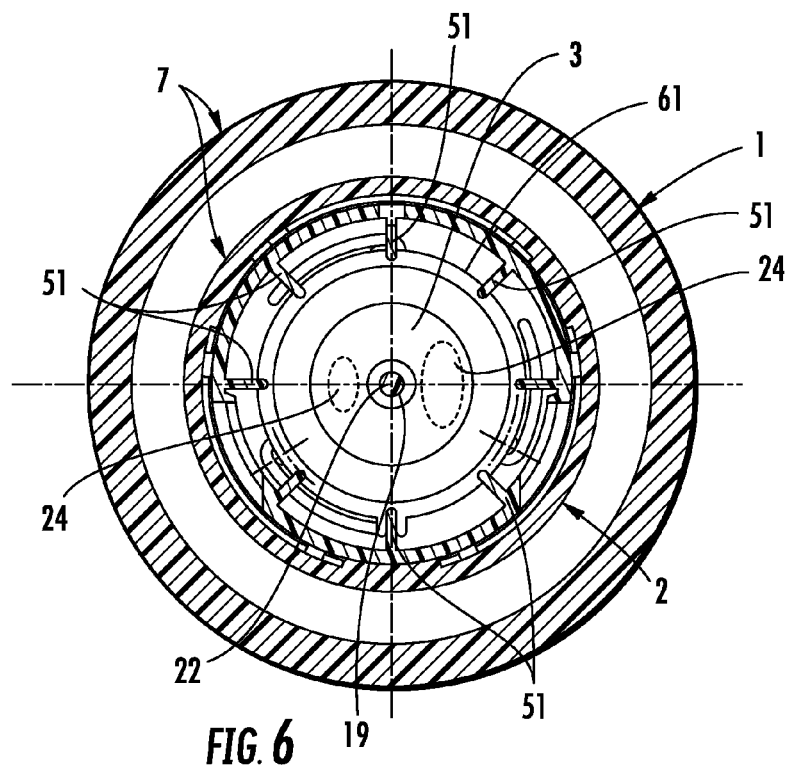

As further shown in FIG. 1, the upper end face of the shell 5 consists of a wall 12, which extends itself transversely to the center axis 10 of the air release valve. This wall 12 is penetrated by outlet openings 13, 14. The outlet openings 13, 14 open into an outlet channel 16, which is confined within the flange part 7 and the housing wall 12 and in turn, this outlet channel 16 communicates with the outlet fitting 9. The outlet openings 13, 14 position themselves—in relation to centerline axis—diametrically opposite one another and are bordered, respectively, by an (elsewhere described) necking 17, the tees of which extend downward from the top housing wall 12. The end facing of the necked tees are conically chamfered to allow the proper machining of sealing seats 18 encircling the outlet openings 13, 14 which are to have a planar, complementary contact with the sealing element 3. The sealing element is, as is evident in FIG. 6, a circular section of a flexible membrane, for example this being of fluoro-silicone-rubber. This possesses a central boring 19, which is confined on both sides within a collar 20 extending itself from the sealing element. This boring 19 is penetrated by an alignment pin 22, which is an integral, part of the float 2. The alignment pin 22, which is placed to run coincident with the center line 10 of the air release valve as rod 39, possesses on its free end a radially expanded head 25, which the rim of the boring 19, or more precisely, the collar 20, circumferentially supports by a backcut. A section of wall stretching between the outlet openings 13, 14 is shaped into a dome 26, which rises above and encompasses the contact zone of the sealing element 3, i.e., rising above the free end of the alignment pin 25.

Figure 5:
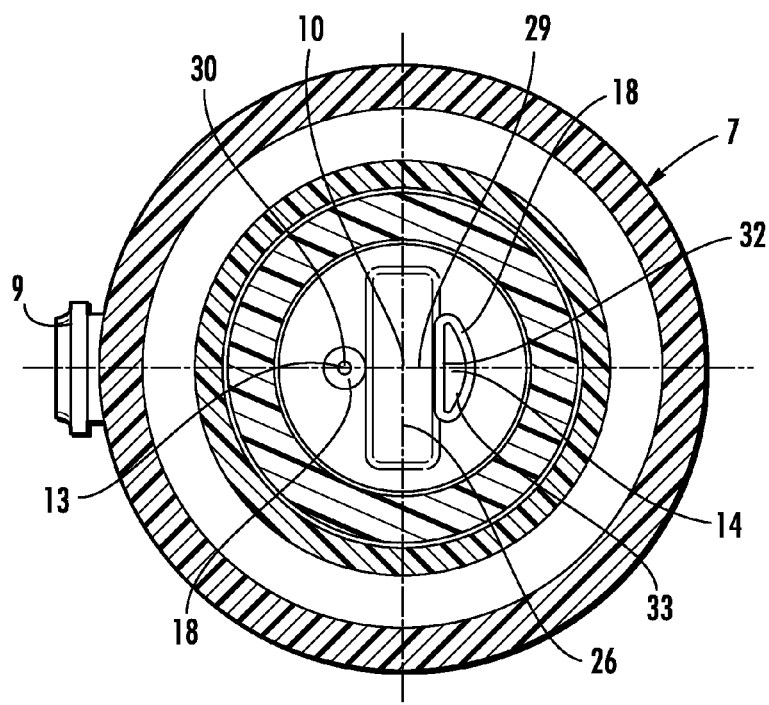
Figure 7:
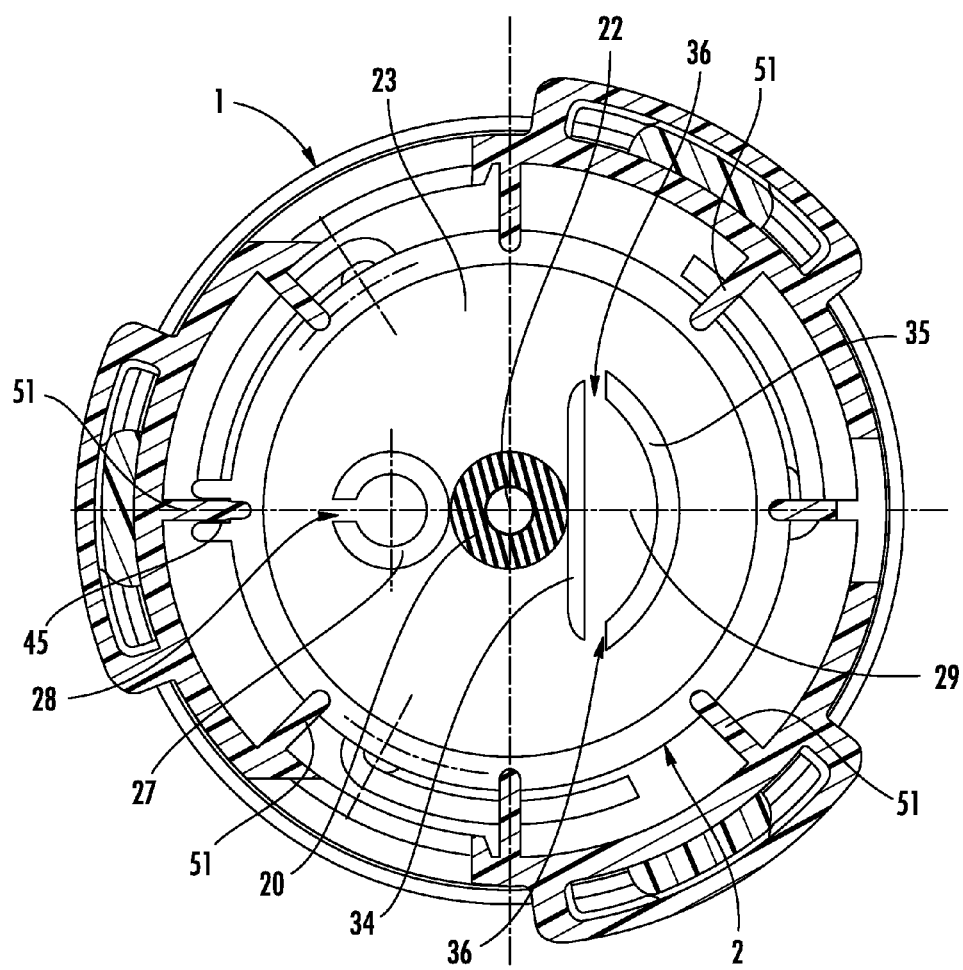
Figure 8:
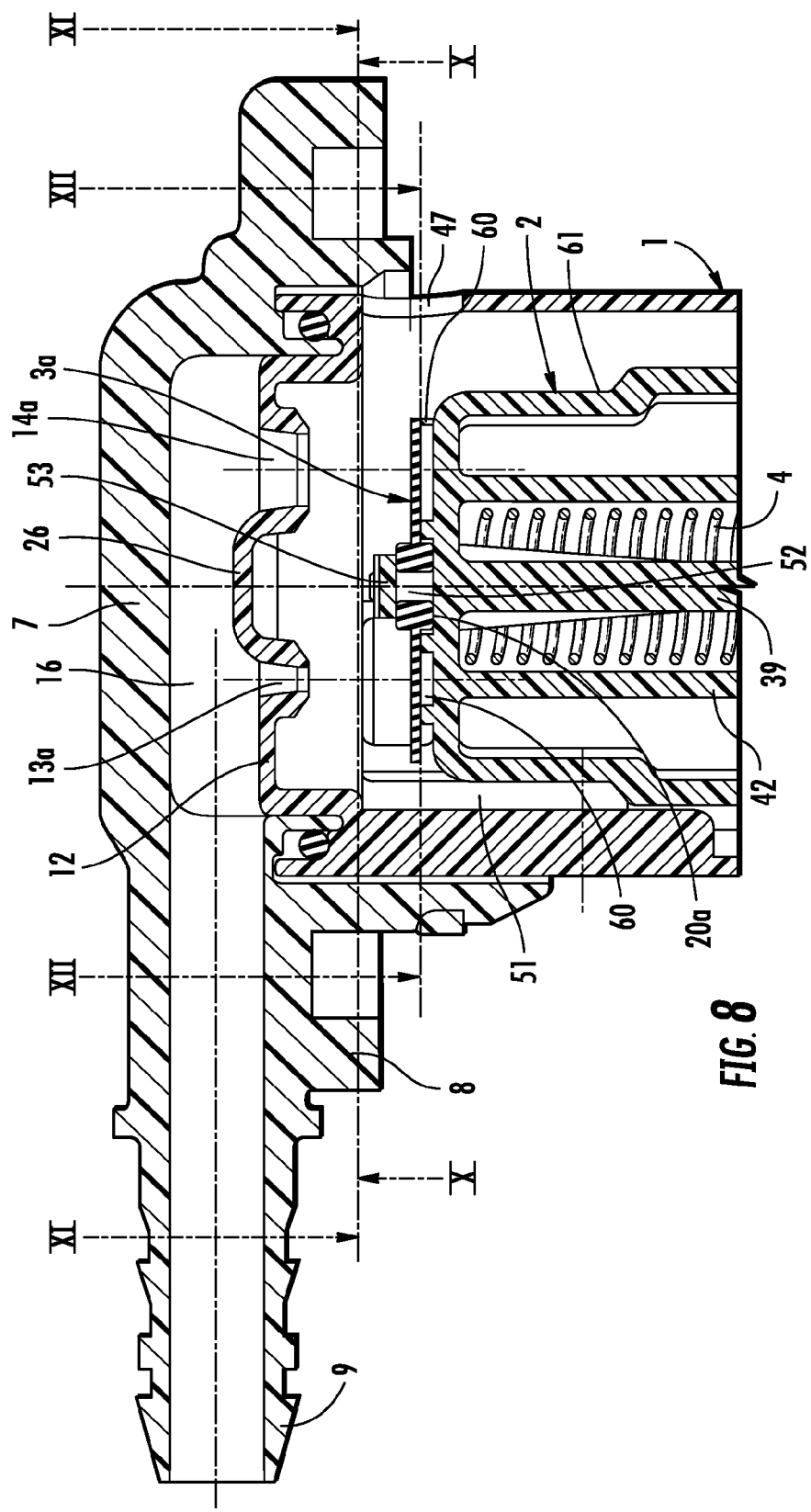
Figure 9:
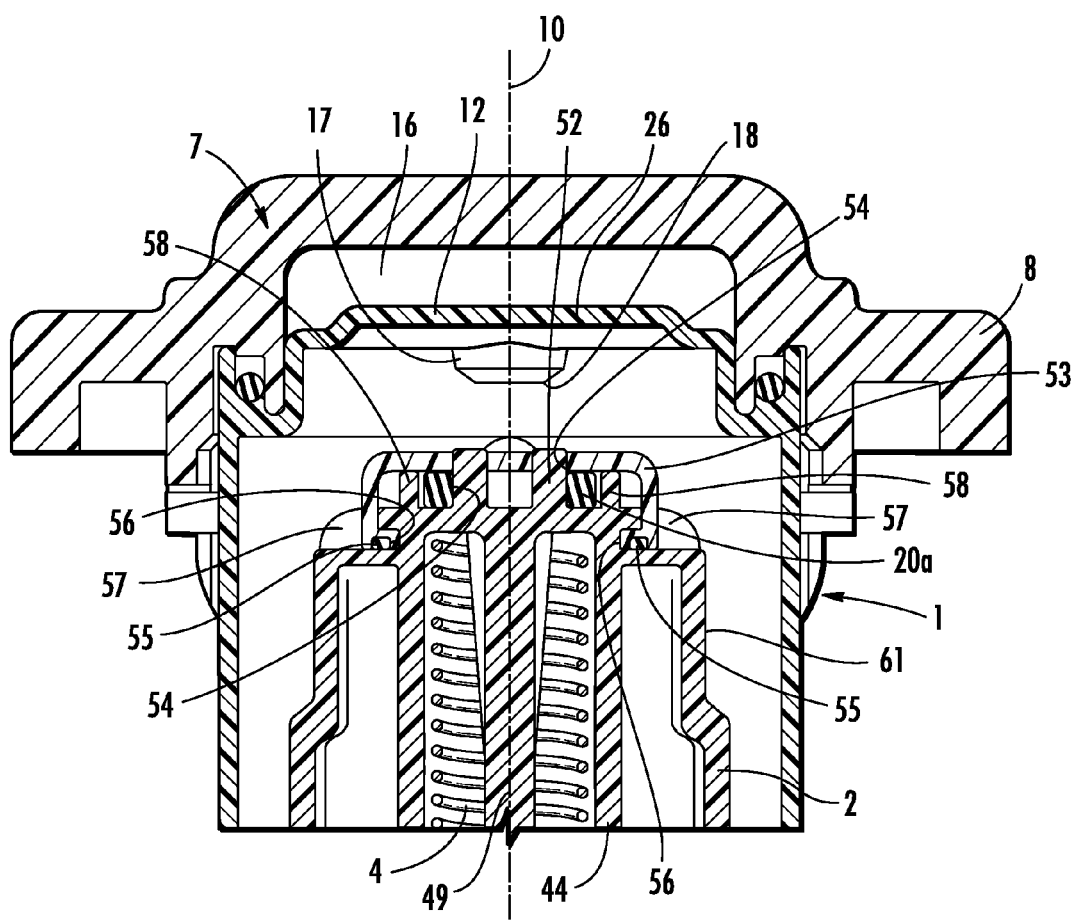
Figure 10:
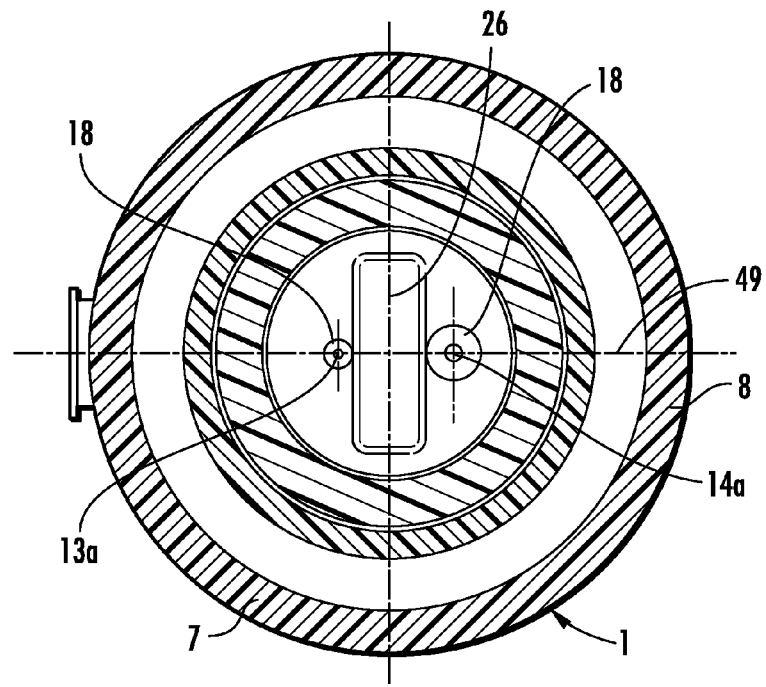

The sealing zones 24 (see FIG. 6) of the seal elements 3, which coact with the outlet openings 13, 14, are so supported by a reinforcing structure on the upper side 23 of the float 1, that the zones 24 run parallel to the extended plane of the sealing seats 18 (see FIG. 5). In case of the outlet opening 13 with a circular, cross-sectional opening, the structure comprises an extending rib 27 (see FIG. 7) extending in the axial direction from the upper side 23 of the float. The outlet opening is designed to be in the shape of a ring, wherein the ring is opened by a gap 28. The outlet opening 14 with the greater through-put cross-section has, approximately, an oval shape. This possesses a somewhat linear, gap 36 running at right angles to the connection fitting line 29. The (outlet) connection line 29 in the plane of the centerline of the outlet fitting 9 is defined at least by the intersection therewith of the centerline 30 (FIG. 5) of the outlet opening 13 and the intersection therewith of the centerline 10 of the valve assembly. The oval outlet opening 14 possesses an approximately straight line rim section 32 (FIG. 5), which runs at a right angle to the above defined connection line 29 and the rim thereof designated 33 curves back on itself, thus bordering the approximate oval shape of the outlet opening 14. Serving as a reinforcing structure, molded ribs 34, 35 extending themselves axially, are to be found on the upper side 23 of the float 2, wherein the rib 34 is straight line in shape, while rib 35 runs in a bow-shaped curve. The free ends of the ribs 34, 35 are separated from one another by a recess 36.

The float 2 is closed off by a transverse top wall 37 and runs downward therefrom as a open cylindrical shell 5. Molded on to the transverse wall 37 of the float, is to be found transverse thereto, a centrally located rod 39, running coaxially to the longitudinal axis of the float 2. This rod 39 extends itself yet further with an excess length 40, protruding out of the under side of the float 2. Further, from the transverse top located wall 37, enclosed by wall 42, extends downward another float-integral cylindrical chamber, this chamber being also coaxial and with a diameter to accommodate at least the rod 39. Within this chamber 42 is placed the above mentioned helical spring 4. This helical spring 4 abuts against transverse top wall 37 and against the bottom 6. The shell 42 is available to the outer wall of the float 2 by means of radial wall 41. On the bottom 6 is placed an upward extending apron 43, which is parallel to and surrounds the central axis. The interior space of the apron stands above a bottom opening 44, which communicates with the tank interior and accepts therein the lower end of the rod 39. The apron 43 is encapsulated by the lower end of the helical spring 4 base winding. The float 2 is axially guided within the housing 1 by means of coaction between rod 39 and apron 43. An additional axial guidance as well as a fixation of rotation is assured by a rib 46 projecting from the inner side of the shell part 5, which rib engages itself in an axial running groove 45 on the float 2. Further, ribs 51 extend themselves radially from the inside of the housing 1 inward. These grooves 45 work in combination with an upper radially narrowed down portion 61 of the float 2.

Figure 3:
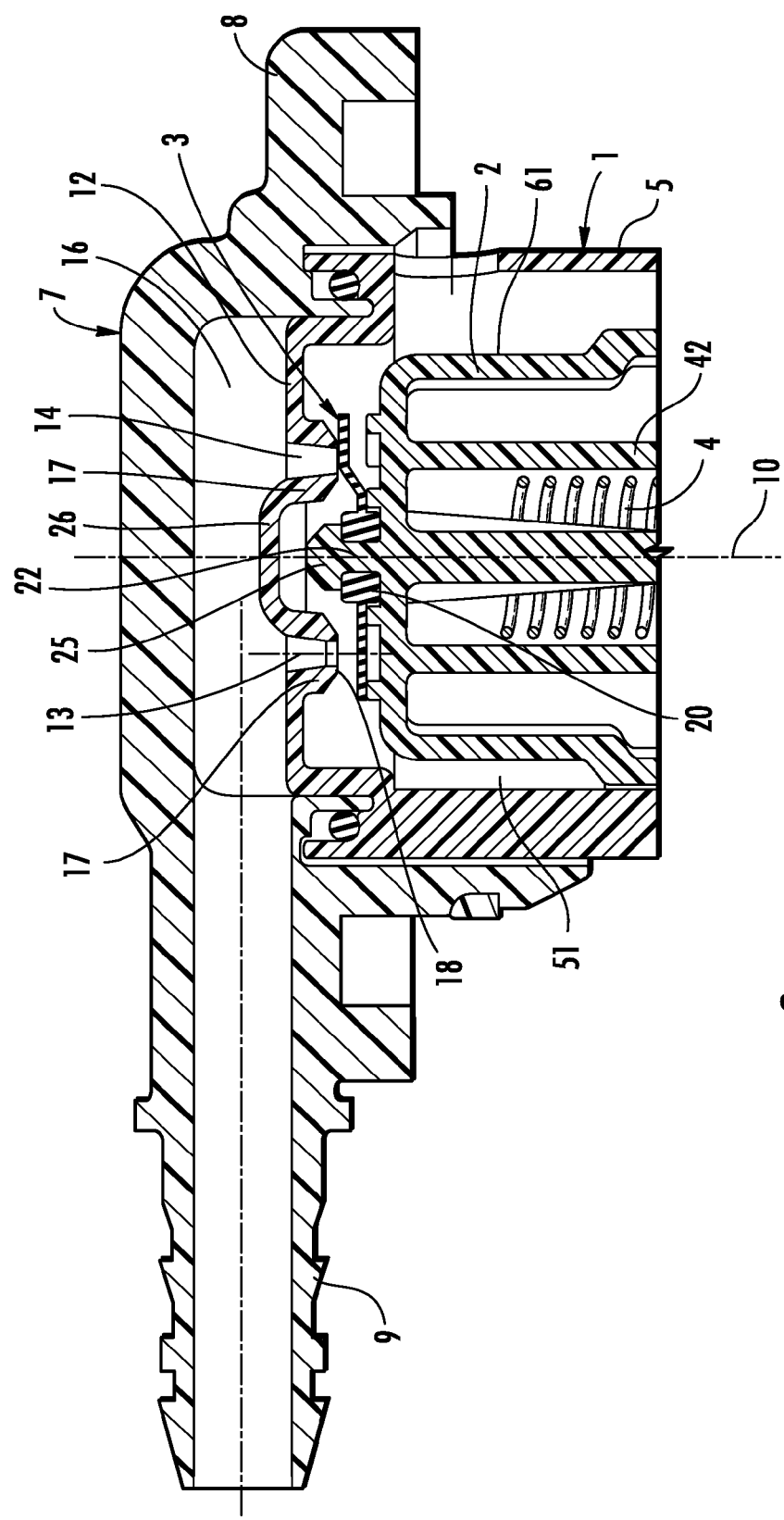
Figure 4:
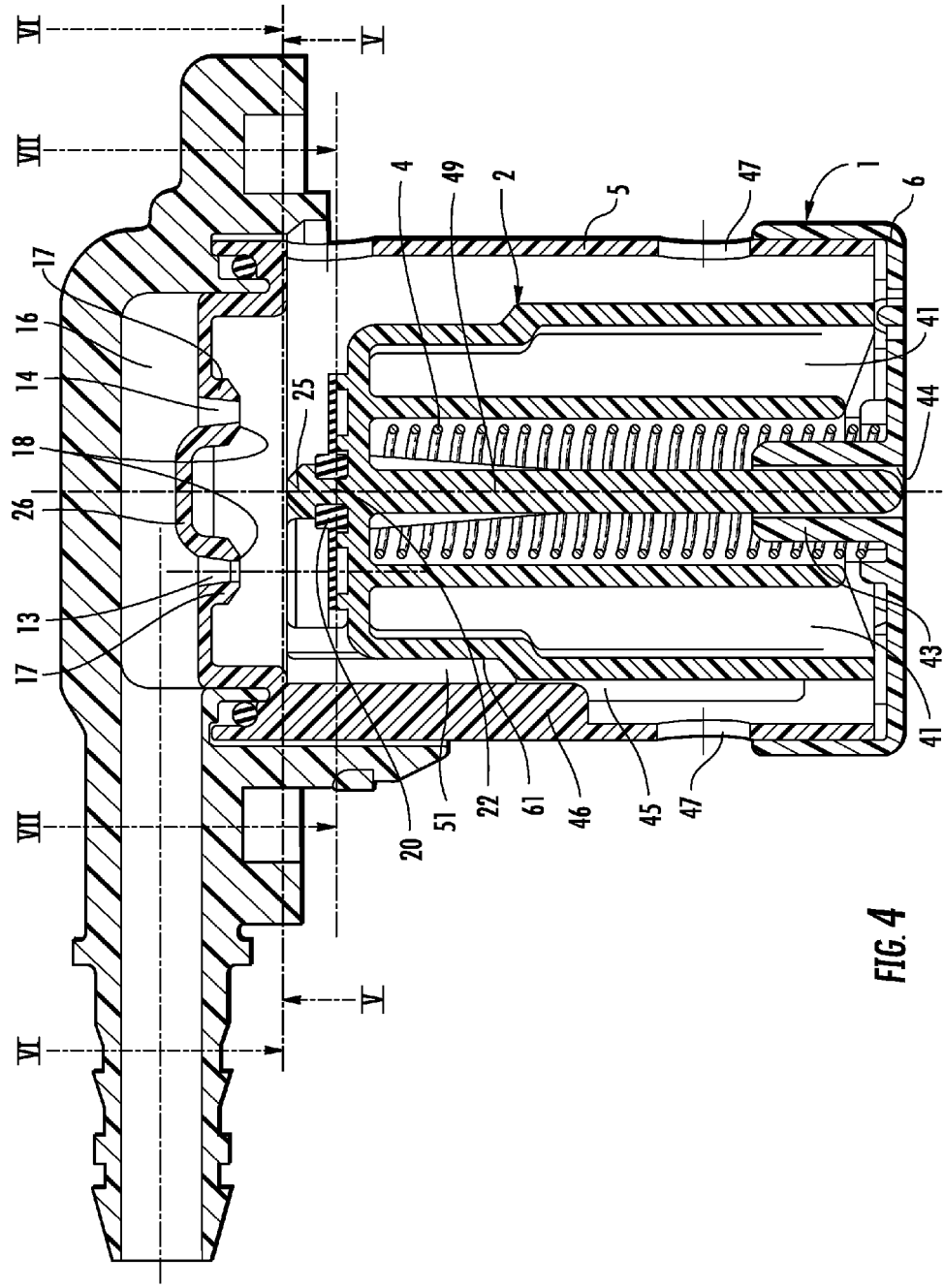

In the situation seen in FIG. 4, the air release valve is in the open position. The float lies with its lower end resting on the bottom 6. By means of first, the inlet openings 47 in the housing, second, the outlet openings 13, 14 and third, the outlet channel 16 it is possible to establish a gas exchange between the ambient atmosphere and the tank interior. If the float 2, possibly because of turbulent fuel, is pressed by its sealing element against the sealing seats 18 of the outlet openings 13, 14, then the said float will be held still because of an inner pressure developed within the tank. Because of the relatively small throughput cross-section of the single outlet opening 13, the force against the sealing seat is particularly small. The membrane-like flexible sealing element 3 can thus, because of the inherent weight of the float, be withdrawn from the sealing seat, as this is made evident in FIG. 3 in the view of the outlet opening 14. By means of the small outlet opening 13, gas can flow freely outward, whereby the interior pressure within the valve is continually relieved. Thereby, the pressure difference across the sealing area 24 at the larger outlet opening 14 is reduced, so that at that place the sealing element 3 can be withdrawn from the seat of the sealing because of the inherent weight of the float 2. The recesses 28, 36 of the ribs 27, 34, 35 prevent that the sealing element contacting thereon would bind thereon in the manner of a suction cup.

The embodiment example pictured in FIGS. 8 to 12 differs from that described above, in that the second outlet opening 14a has a through-put opening of a circular cross-section, and that the sealing element 3a is a strip shaped membrane section and is affixed to the float 2 in a different mode and manner.

Figure 11:
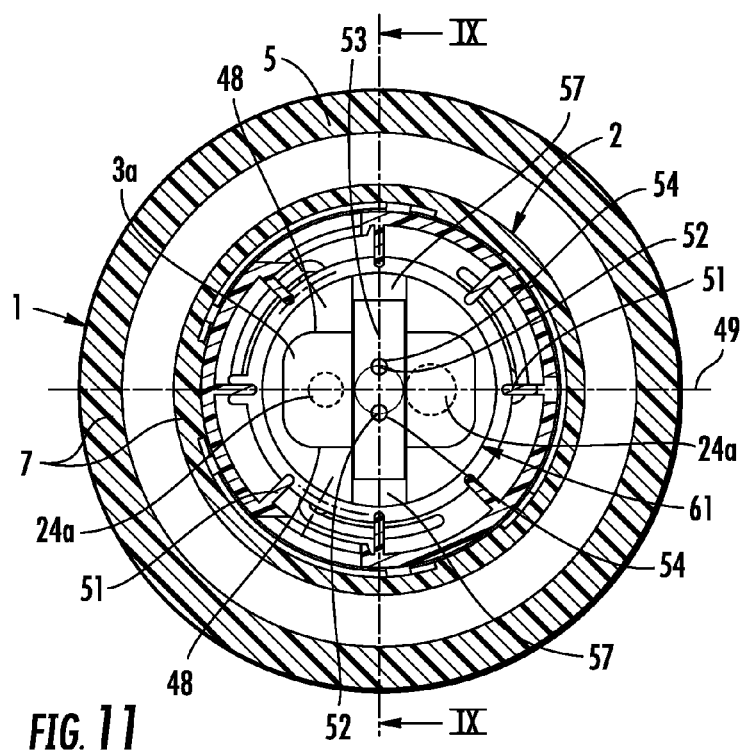
Figure 12:
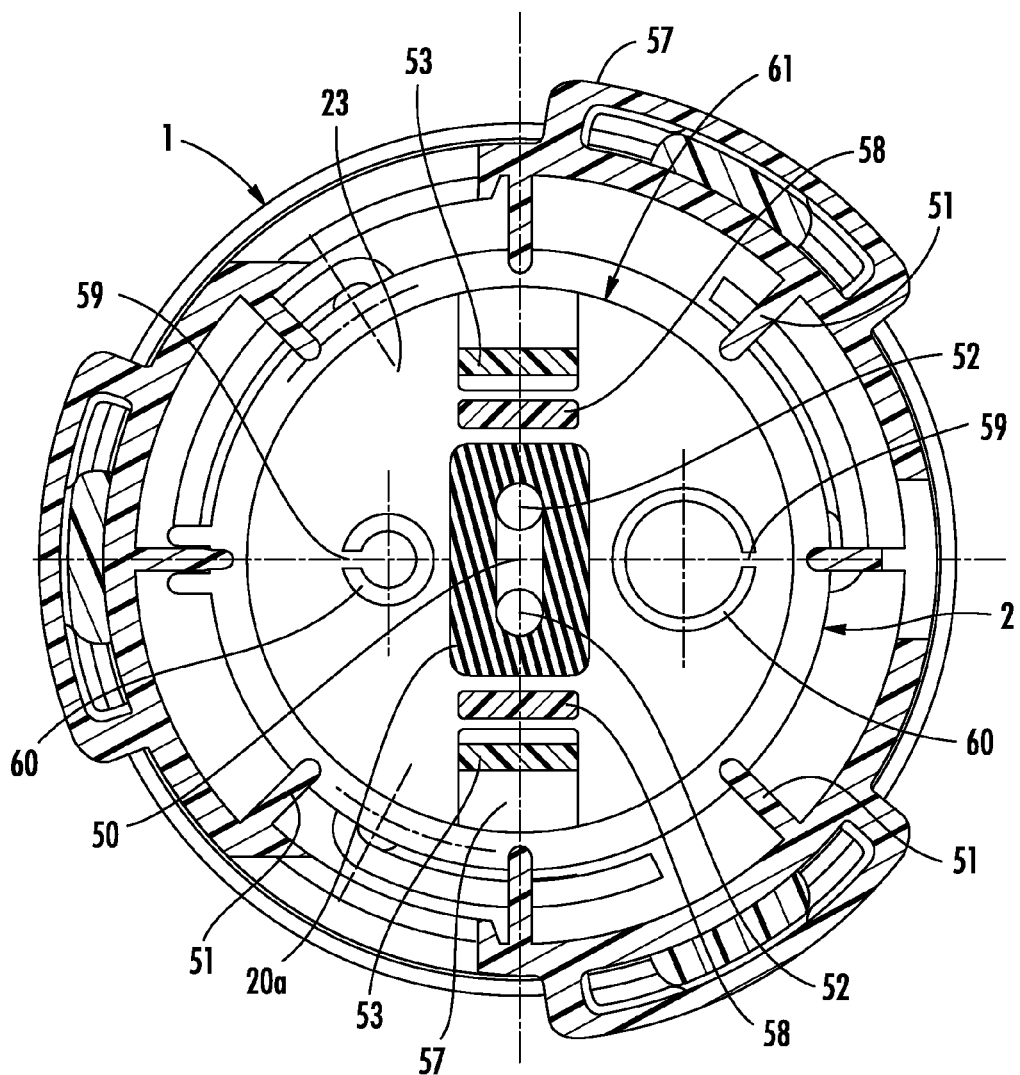

The sealing element 3a, in this alternate case, is a rectangular strip, the longitudinal side 48 of which extends itself parallel to the attachment line 49 (FIGS. 10, 11) and runs between the outlet openings 13a and 14a. Placed in the middle of the sealing element 3a is a slot 50 (FIG. 12), the length of which runs transversely to the long side 48 of the seal 3 (FIGS. 11, 12). The slot 50 is penetrated by two pins 52 which project from the float. The pins 52 are placed in the ends of the slot 50. The ends are enclosed on both sides by a collar 20a which extends away from the flat sides of the sealing element 3a. The collar 20a and therewith the entire sealing element 3a is fixed in place by a yoke 53 onto the float 2. The yoke 53, which has a width somewhat equal to the collar 20a, is penetrated by two borings 54. These borings 54 serve the purpose of accommodating the free ends of the pins 52. The free ends of the yoke 53 are axially bent downward and carry a hook 55 (FIG. 9) which extends itself transversely to the centerline 10. This hook 55 respectively engages itself in a complementary recess 56, which is integral with the float 2. The recesses 56 are respectively located in a groove 57 which runs from the rim of the upper side 23 of the float radially toward the inside. The collar 20a is restricted on its narrow side by two wall sections 58 which extend out of the upper side 23 of the float 2. The said yoke 53 supports itself also on these wall sections 58. In the same manner as explained in the former embodiment, the sealing area 24a (FIG. 11) of the sealing element 3a is reinforced by support structures. These support structures are toroidal ribs 60, which are respectively interrupted by a recess 59. Recess 59 is shown on FIG. 12.

While various embodiments have been shown and described, those skilled in the art will recognize that changes and modifications may be made to the foregoing examples without departing from the scope and spirit of the disclosed inventions. For example, geometries and dimensions of various elements of the described embodiments and materials used for those embodiments may be altered to suit particular applications. It is intended to claim all such changes and modifications as fall within the scope of the appended claims and their equivalents.

The invention claimed is:

1. An air release valve for a fuel tank of motor vehicles, comprising:
   a housing with at least one inlet opening and defining a central axis;
   a float located in the housing and movable along the central axis of the housing; and
   a sealing element including a flexible membrane on an upper side of the float, the housing further defining two outlet openings of different sizes, each outlet opening bordered by a respective sealing seat, the flexible membrane coacting to seal both of the outlet openings, whereby the membrane is bound on and extends freely from the upper side of the float at a point of affixment located radially adjacent to one of the outlet openings, the point of affixment being bound to an alignment element centrally placed on the float, the outlet openings being diametrically opposite to one another in reference to the point of affixment.

2. An air release valve in accord with claim 1, further comprising a housing wall, which is penetrated by the outlet openings and by a dome which extends axially away from the point of affixment and covers the point of affixment.

3. An air release valve in accord with claim 2, wherein the dome is located on a wall area extending between the outlet openings.

4. An air release valve in accord with claim 2, wherein the membrane possesses a boring, which is penetrated by an undercut alignment pin of the float.

5. An air release valve in accord with claim 4, wherein the membrane is in the form of a collar defining two sides, the collar projecting away from the alignment pin on both sides and accommodating the undercut of the alignment pin via the boring.

6. An air release valve in accord with claim 1, further comprising a downward extended, extruded necking bordering the outlet openings.

7. An air release valve in accord with claim 1, wherein the sealing seats define sealing areas, the sealing areas coacting between the outlet openings and an existing support structure on the upper side of the float in such a manner that the sealing areas are coplanar.

8. An air release valve in accord with claim 7, wherein the support structure is formed by at least one projection extending from the upper side of the float, the projection coacting in conjunction with a part of a respective surface of one of the sealing areas.

9. An air release valve for a fuel tank of a motor vehicle, the air release valve comprising:
- a housing defining at least one inlet opening therein, a central axis and a wall disposed proximate the intlet opening, the wall defining at least two outlet openings therein, the two outlet openings being sized differently;
- two sealing seats, each sealing seat being disposed about a respective one of the two outlet openings;
- a float disposed in the housing moveable along the central axis, the float defining a center aligned with the central axis; and
- a flexible membrane attached at a point of affixment proximate the center of a top of the float and extending freely therefrom to seal the two outlet openings, the point of affixment being located radially adjacent to one of the outlet openings, the outlet openings being disposed diametrically opposite each other across the point of affixment.

10. The air release valve as in claim 9, wherein the outlet openings are disposed diametrically opposite each other across the central axis.

11. The air release valve as in claim 9, wherein the flexible membrane is in the form of a collar defining a boring therethrough configured to attach the flexible membrane proximate the center of the float.

12. The air release valve as in claim 11, further comprising an undercut alignment pin connected to the float, the alignment pin penetrating the boring of the flexible membrane.

13. The air release valve as in claim 9, further comprising a support rib on the float, the housing defining a recess therein for slidably receiving the rib.

* * * * *

UNITED STATES PATENT AND TRADEMARK OFFICE
CERTIFICATE OF CORRECTION

PATENT NO.       : 7,614,417 B2                         Page 1 of 1
APPLICATION NO.  : 11/496012
DATED            : November 10, 2009
INVENTOR(S)      : Simon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 389 days.

Signed and Sealed this

Nineteenth Day of October, 2010

David J. Kappos
*Director of the United States Patent and Trademark Office*